US006300862B1

(12) United States Patent
Ishida

(10) Patent No.: US 6,300,862 B1
(45) Date of Patent: Oct. 9, 2001

(54) PTC COMPOSITE MATERIAL

(75) Inventor: Yoshihiko Ishida, Nagoya (JP)

(73) Assignee: NGK Insulators, Ltd., Nagoya (JP)

(*) Notice: Subject to any disclaimer, the term of this patent is extended or adjusted under 35 U.S.C. 154(b) by 0 days.

(21) Appl. No.: 09/497,845

(22) Filed: Feb. 3, 2000

(51) Int. Cl.[7] ..................................................... H01C 7/10
(52) U.S. Cl. ...................... 338/22 R; 252/500; 252/516; 252/519.3; 252/520.2; 252/521.3; 252/521.2; 252/521.4
(58) Field of Search ........................... 338/22 R; 252/500, 252/516, 518.1, 519.5, 520.2, 521.2, 521.3, 521.4

(56) References Cited

U.S. PATENT DOCUMENTS

| 3,804,608 | * | 4/1974 | Gaskell et al. ............................ 65/33 |
| 6,008,151 | * | 12/1999 | Sasaki et al. ............................ 501/17 |
| 6,030,681 | * | 2/2000 | Czubarow et al. .................. 428/65.3 |

OTHER PUBLICATIONS

T. Ota et al., "Positive–temperature–coefficient Effects in Conductive–Ce–ramic/High–expansive–ceramic Composition," Journal of Materials Science Letters 16, (1997) pp. 239–240.

T. Harada et al., "Preparation of Graphics/Cridstobalite/Silicone Rubber PTC Composites," Journal of the Ceramic Society of Japan, Int. Edition, 104(12),(1996) pp. 1133–1136.

* cited by examiner

Primary Examiner—Yogendra Gupta
(74) Attorney, Agent, or Firm—Burr & Brown

(57) ABSTRACT

A PTC composite material including a matrix of ceramic material having one of a cristobalite crystal structure and a tridymite crystal structure, each doped with an oxide of at least one of Be, B, Mg, Al, Ca, Sc, Ti, V, Cr, Mn, Fe, Co, Ni, Cu, Zn, Ga, and Ge, and a conductive phase dispersed throughout the matrix. The conductive phase includes at least one of a metal, silicide, nitride, carbide and boride.

15 Claims, 1 Drawing Sheet

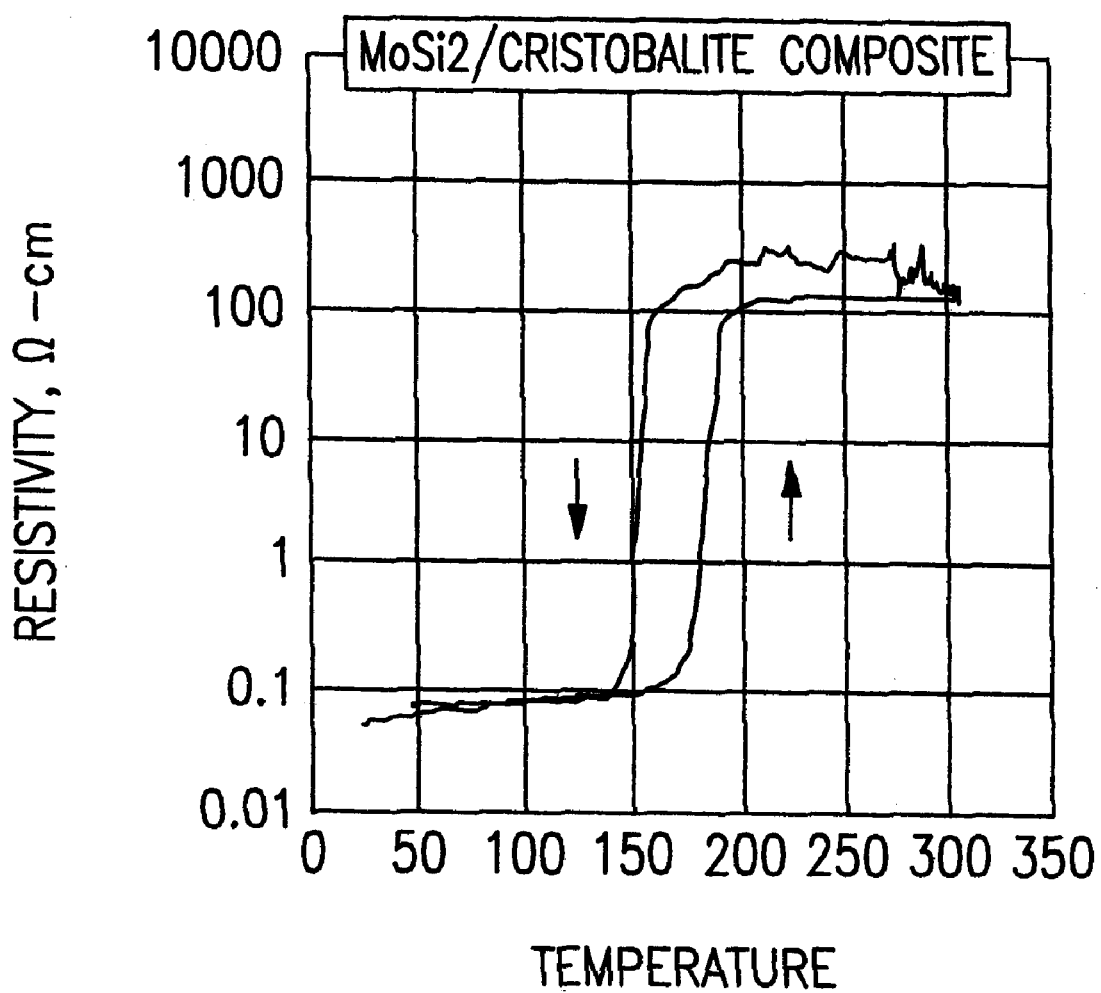

PTC COMPOSITE MATERIAL

BACKGROUND OF THE INVENTION

1. Field of the Invention

The present invention relates to a PTC ("positive temperature coefficient of resistance") composite material favorably used in, for example, a current-limiting element which controls fault current.

2. Description of Related Art

The electrical resistance of PTC materials increases sharply with increasing temperature within a particular temperature range. Therefore, PTC materials are used, for example, as current-limiting elements which control fault current in a circuit.

The best known PTC material is a barium titanate type ceramic whose electrical properties change at the Curie point thereof. With this PTC material, however, power loss is large because of its high room temperature resistivity and, moreover, the production cost is high. Hence, the industry began searching for other substances that exhibit the PTC property. As a result, it was discovered that composite materials made of a polymer matrix and a conductive filler exhibited the same type of PTC property possessed by the barium titanate type ceramic.

For example, a mixture consisting of particular proportions of a crystalline polymer (e.g. a polyethylene) as an insulator and conductive particles (e.g. carbon particles) as conductive paths formed in the polymer matrix, exhibits very low room temperature (i.e., 30° C.) electrical resistance, and acts as a conductor as a result of insulator-conductor transition. Specifically, since the polymer has a thermal expansion coefficient that is much greater than that of the conductive particles, the crystalline polymer expands dramatically when the composite material is heated and the crystalline polymer is melted. As a result, the conductive particles forming the conductive paths in the polymer are separated from each other at the melting point temperature of the polymer, the conductive paths are cut, and the electrical resistance of the composite material increases sharply. That is, the composite material exhibits PTC behavior.

When an organic substance such as the above polymer or the like is used as a matrix in a PTC composite material, however, there has been a problem in that when high temperatures caused by fault current continue for a long time, the composite material is unable to exhibit its intended action because the organic substance is generally low in heat resistance. Conventional polymer composite materials also have a problem in that they allow no reliable repeated operation, because the resistance of the material after a trip condition does not return to the initial resistance. It is thus difficult to rely upon these composite materials in sensitive circuit applications.

Studies have also been conducted on composite materials made of a silica type matrix, such as quartz, cristobalite or the like, and conductive particles. Like barium titanate type ceramics, however, these materials are high in room temperature resistivity and thus cause a large power loss. These materials also have a transition temperature (i.e., trip-point temperature) greater than 200° C., thus making their use in certain circuit applications inappropriate.

SUMMARY OF THE INVENTION

In view of the above-mentioned problems with the prior art, the present invention has been completed to provide a reusable PTC composite material which has low room temperature resistivity, large resistivity jump at the transition temperature thereof, a transition temperature less than 200° C., high heat resistance, and low power loss.

According to the present invention, there is provided a PTC composite material comprising (i) a matrix of ceramic material having one of a cristobalite crystal structure and a tridymite crystal structure, doped with an oxide of at least one of Be, B, Mg, Al, Ca, Sc, Ti, V, Cr, Mn, Fe, Co, Ni, Cu, Zn, Ga, and Ge, and (ii) a conductive phase dispersed throughout the matrix, the conductive phase comprising at least one of a metal, silicide, nitride, carbide and boride. The ceramic material preferably is one of cristobalite phase $SiO_2$, tridymite phase $SiO_2$, cristobalite phase $AlPO_4$, and tridymite phase $AlPO_4$.

Doping the matrix phase with the above-listed materials, preferably in an amount of 0.1 mol % to 20 mol %, results in a decrease in the transition temperature (i.e, the trip-point temperature) of the material to a level not greater than 200° C., while maintaining a room temperature resistivity of less than 1 Ωcm. Moreover, the "resistivity jump" at the trip-point temperature (i.e., the increase in resistivity at the trip-point temperature) of the material is at least 10, preferably at least 100, more preferably at least 1000, and most preferably at least 10,000 (and in some cases as high as $10^9$).

The conductive phase of the PTC material typically takes the form of particles selected from the materials described above. Silicides of Ti, Zr, V, Nb, Ta, Cr, Mo, W, Co, and Fe are preferred conductive materials. These materials increase the cycle life of the PTC material, since silicides create a strong chemical bond with the matrix material and thus enhance the overall strength of the composite material. Silicides of Mo, Ta, W, Cr and Nb are most preferred, since those materials are also stable in air at high temperatures, and are thus less prone to deterioration during the high temperature operations used to form the composite material (e.g., the composite material can be dewaxed in an air atmosphere).

The average size of the conductive particles that form the conductive phase in the composite material is preferably 5 to 100 μm, more preferably 20 to 60 μm. If the average particle size is less than 5 μm, the room temperature resistivity of the resultant material tends to be too high, and the resistivity jump at the trip-point temperature tends to be too low. If the average particle size exceeds 100 μm, however, the cycle life of the composite material is degraded, as the stress due to thermal expansion mismatch between the matrix material and the conductive phase becomes too large. It is preferred that the conductive phase be present in an amount of 10 to 45% by volume (with respect to the total volume of the composite material), more preferably 20 to 35% by volume.

The PTC composite material also preferably has a relative density of 90% or higher, in order to lower the room temperature resistivity of the composite material, as porosity essentially acts as an insulating phase in the material. It is also preferred that, at the trip-point temperature of the composite material, the material expand from 0.2% to 1.4% (by volume). If the volume expansion is less than 0.2%, the composite material does not exhibit sufficient resistivity jump at the trip-point temperature. If the volume expansion is more than 1.4%, the composite material may experience stress cracking at the interface between the matrix and conductive phase.

It is also preferred that the composite material is produced at a firing temperature at least 20° C. lower than the melting point of the lowest melting point material contained in the conductive phase of the composite material. This will maintain the position of the conductive particles making up the conductive phase during the firing operation. If the conductive particles were allowed to melt and agglomerate, there is a concern that relatively high conductivity areas may be formed through the composite material, and thus substantially decrease the high temperature resistivity of the composite material. Moreover, melted conductive particles could escape the matrix, thus making it difficult to control the volume ratio of conductive particles in the composite material.

BRIEF DESCRIPTION OF THE DRAWINGS

For a fuller understanding of the nature and objects of the invention, reference should be made to the following detailed description of a preferred mode of practicing the invention, read in connection with the accompanying drawing, in which:

The figure is a graph showing the temperature dependency of electrical resistance, of the PTC material of Example 1–5 according to the present invention.

DETAILED DESCRIPTION OF THE INVENTION

In the present PTC composite material, a ceramic material having one of a cristobalite crystal structure and a tridymite crystal structure (preferably one of cristobalite phase $SiO_2$, tridymite phase $SiO_2$, cristobalite phase $AlPO_4$, and tridymite phase $AlPO_4$) is used as the matrix. These materials undergo dramatic volume expansion at specified temperatures when the crystal structure of the material changes from one phase/structure to another phase/structure. These transition temperatures typically range from 220 to 250° C.

The present invention makes use of this dramatic volume expansion that occurs in the matrix materials described above. Specifically, the matrix material, when combined with the conductive phase materials described above, exhibits relatively low room-temperature resistivity which allows current to pass therethrough via the conductive phase. As an overcurrent condition occurs, and the internal temperature of the composite material increases to the crystal transition temperature of the matrix, however, the matrix material rapidly expands and disrupts the conductive path formed by the conductive phase. This in turn results in a rapid increase in the resistivity of the overall composite material, which enables the composite material to exhibit PTC behavior.

While the concept of using cristobalite matrix/conductive particle composite materials in this regard has been disclosed in NGK Insulators, Ltd. U.S. patent application Ser. No. 09/035,074, the entirety of which is incorporated herein by reference, the temperature at which the crystal structure transition occurs is too high for some circuit applications. Accordingly, in accordance with the present invention, the matrix material is doped with at least one oxide of Be, B, Mg, Al, Ca, Sc, Ti, V, Cr, Mn, Fe, Co, Ni, Cu, Zn, Ga, and Ge, preferably in an amount of 0.1 mol % to 20 mol %. The dopant material is effective to decrease the transition temperature of cristobalite to 130° C. to 180° C. (the phase transition temperature of undoped cristobalite phase $SiO_2$ and undoped cristobalite phase $AlPO_4$ is about 245° C. and 220° C., respectively) and that of tridymite to 110° C. to 150° C. (the phase transition temperature of undoped tridymite phase $SiO_2$ and undoped tridymite phase $AlPO_4$ is about 180° C. and 160° C., respectively), thus making the composite material suitable for a wider variety of electronic applications. The preferred dopants are Al and B, as those materials are most effective in decreasing the crystal structure transition temperature of the matrix phase.

The matrix material is preferably doped in an amount of 0.1 mol % to 20 mol %. If the amount of dopant is less than 0.1 mol %, there is no significant decrease in transition temperature of the matrix material. On the other hand, if the amount of dopant exceeds 20 mol %, it is difficult to maintain the crystal phase of the initial matrix material. The dopants can be used individually or in combination, and can be added to the composite in oxide, carbonate, sulphate, chloride or nitrate form, as long as the material converts to oxide form during dewaxing or sintering.

The above-described materials for the matrix all have relatively high melting points (e.g., 1730° C. for cristobalite phase $SiO_2$), and thus have excellent heat resistance especially when compared to the polymeric matrices used in the prior art. Accordingly, there is no concern that the composite material will melt or ignite during use, even if prolonged periods of high current pass through the composite material. The preferred crystal phases described above can be introduced into the composite material at the raw material stage or can be created in the composite material during firing. Cristobalite phase $SiO_2$, for example, can be obtained by calcining quartz at high temperatures. Cristobalite can also be obtained by calcining quartz at low temperatures in the presence of an alkali metal or alkaline earth metal which stabilizes cristobalite.

The conductive phase is created in the composite material by adding conductive particles to the matrix raw material, which is an insulator. The conductive particles preferably include silicides of Ti, Zr, V, Nb, Ta, Cr, Mo, W, Co, and Fe. The room temperature resistivity of the conductive particles should be $10^{-3}$ $\Omega$cm or less, to enable the room temperature resistivity of the PTC material to be 1.0 $\Omega$cm or less, thus suppressing the power loss of the PTC material. Therefore, materials having a room temperature resistivity of more than $10^{-3}$ $\Omega$cm should not be used as the conductive particles in the present PTC material.

The average particle size of the conductive particles is preferably 5 to 100 $\mu$m, more preferably 20 to 60 $\mu$m. An average particle size of at least 5 $\mu$m is important to maintain sufficiently low room temperature resistivity and sufficiently high resistivity jump at the trip-point temperature of the composite material. If the average particle diameter of the conductive particles exceeds 100 $\mu$m, the composite body will have decreased cycle life due to a large thermal expansion mismatch between the matrix and conductive phase. Accordingly, while the PTC effect increases and room temperature resistivity decreases as average conductive particle size increases, the cycle life of the composite material also decreases.

It is also important to maintain a volumetric ratio of at least 10 to 45% by volume of conductive particles with respect to the overall volume of the composite material. Decreasing the volumetric ratio of conductive particles below 10% could make it difficult to obtain acceptably low room temperature resistivity in the composite material. Increasing the volumetric ratio of conductive particles above 45%, however, makes it difficult to disrupt the conductive phase in the composite material at the trip-point temperature. In such a case, it could be difficult to obtain a resistance jump of at least 10, which is typically required in most electronic applications.

The amount of conductive particles to be added depends on the average diameters of matrix particles and conductive particles. The amount of conductive particles is preferably 25 to 40% by volume of the entire volume of the PTC composite material when the average particle diameter of the conductive particles is in the range of 0.1 to 10 $\mu$m and 20 to 35% when the average particle diameter of the conductive particles is in the range of 5 to 50 $\mu$m.

In the present invention, the PTC composite material is preferably produced by firing at a temperature at least 20° C. lower than the melting point temperature of the lowest melting point material contained in the conductive particles. This will prevent melting of the conductive particles during firing, which in turn maintains the conductive particles within the body of the composite material. If the conductive particles were allowed to melt and escape the sintered body of composite material, it would be difficult to maintain the intended ratio between conductive particles and matrix material. Moreover, allowing the conductive particles to melt during firing could also allow those particles to agglomerate and cause very low resistance conductive paths through the composite material which cannot be disrupted even when the matrix material undergoes dramatic volume expansion.

Accordingly, when a single material is used for the conductive particles, the firing of the composite material should be performed at a temperature at least 20° C. lower than the melting point temperature of the conductive particles. On the other hand, if a mixture of different conductive particles is used, the composite material should be fired at least 20° C. lower than the melting point temperature of the lowest melting point temperature material used in the conductive particles.

The PTC composite material should be sintered for a sufficient time and at a sufficiently high temperature to provide a relative density in the finally sintered body of at least 90%, more preferably at least 95%. If the relative density is less than 90%, it is difficult to rely upon the PTC composite material in repeated overcurrent conditions, as the room temperature resistivity of the material tends to change after each trip condition. Again, when designing a sensitive electronic circuit, the designer must be able to rely upon the PTC composite material maintaining a consistent room temperature resistivity after each trip condition.

In certain applications, such as a thin plate-type PTC component that requires flexibility for mounting, to impart flexibility to the PTC composite material it is desirable to add a polymer component to serve as a portion of the matrix in the PTC composite material described above. In such cases, the polymer can be selected from thermosetting resins such as phenol, epoxy, urea, melamine, polyester, alkyd, diallyl phthalate, or silicone resin (e.g., poly-methyl-siloxane, poly-phenyl-siloxane), and thermoplastic resins such as polyvinyl chloride, polyvinyl acetate, polyvinyl acetyl, acrylic resin, polyethylene, polypropylene, polystyrene, nylon, poly-tetra-fluorethylene, polybutylene-terephthalate, polyphenylene-sulfide, polyamideimide or polyimide. These polymer materials are helpful to enhance the matrix and increase cycle life. Unlike polymer-based PTC materials, the polymer employed in the composite material of the invention need not expand upon melting. Accordingly, a wide variety of polymer materials can be selected (e.g., high heat resistant polymers).

The polymer should be added in an amount of 5–40 vol % with respect to the total volume of composite material. Less than 5 vol % polymer has no flexibility effect, while greater than 40 vol % significantly reduces resistivity jump since overall expansion of the composite material decreases with decreasing amounts of the ceramic matrix.

Use of the dopant materials described above allows the PTC composite material of the present invention to be used at temperatures less than 200° C., thus allowing the use of many of the polymer materials described above. Without the dopant material many of these polymer materials could not be used, as the PTC composite material without the dopant material would exhibit a trip-point temperature greater than 200° C., which exceeds the maximum allowable operating temperature of the polymer.

Of the polymer materials described above, silicone-based resin is preferred, since it does not decompose into a flammable material, and easily forms a chemical bond with the matrix ceramic material to enhance the strength of the overall PTC composite material.

A preferred method of forming the PTC composite material of the present invention will now be explained.

The desired crystal structure (e.g., cristobalite phase $SiO_2$) can be present in the raw material for the matrix or can be created in the matrix during firing of the PTC composite material. Cristobalite phase $SiO_2$ is formed by calcining quartz powder at high temperature, or calcining quartz powder in the presence of an alkali metal or an alkaline earth metal to convert the quartz powder into cristobalite. In this case, the resulting cristobalite phase $SiO_2$ is ground in a wet pot mill to obtain a cristobalite $SiO_2$ powder having an average particle diameter of 5 $\mu$m or less. If quartz is used as the starting material for the matrix, the quartz powder is ground in a wet pot mill to obtain a quartz powder having an average particle diameter of 0.5 to 2 $\mu$m.

The raw materials can be mixed in a wet or dry ball mill, depending upon the flow properties of the raw materials, to obtain a mixture. If quartz is used as a starting material, then an alkali metal or an alkali earth metal is added to the mixture so that the quartz would be converted to cristobalite phase $SiO_2$ during the firing step. These materials also act as a sintering aid during firing.

The resultant mixture is then press molded to obtain an initial molded material. If pressureless sintering is to be used during the firing step, then the mixture is subjected to cold isostatic pressure compaction.

The molded body is now sintered. Molded bodies that were simply press molded are now subjected to hot isostatic pressing at 1100–1500° C. for 1–5 hours under a non-oxidizing atmosphere. Molded bodies that were isostatic press molded are now pressureless sintered at 1200–1800° C. for 1–5 hours under a non-oxidizing atmosphere. Further details of the method used to form the PTC material can be found in copending application Ser. No. 09/035,074.

EXAMPLES

Example 1

A variety of conductive materials were used to form the conductive phase in the resultant PTC body. The average particle size of each material is shown in Table 1. An air classifier was used to separate the conductive particles according to the average sizes shown in Table 1. Quartz powder (having an average particle size of 4 microns) was ball milled with 0.5 mol % alumina powder (having an average particle size of 2 microns) and 0.4 mol % $NaHCO_3$, and the resultant mixture was calcined at 1450° C. for 8 hours to form alumina-doped cristobalite phase $SiO_2$. This material was then ball-milled to an average particle size of 1.1 microns and mixed with the conductive particles shown in Table 1, organic binder and distilled water. The mixture was then vacuum kneaded to form a clay, which was then vacuum extruded to form green sheets. The green bodies were then sintered in a non-oxidizing atmosphere (hydrogen) at 1400° C. for 4 hours.

Each sintered body was then processed into a 5×30 mm quadrangular prism terminated with electrodes, and tested for room temperature resistivity and high temperature resistivity using the DC4-probe method. The results are shown in Table 1.

Each test sample was also subjected to repeated trip conditions to determine whether the room temperature resistivity would be restored after each condition and to test the cycle life of each sample. The cycle test was conducted by heat cycling the sample between 30° C. and 300° C. repeatedly until the room temperature resistivity increased by more than 200%. The results are shown in Table 1.

In those examples using cristobalite phase $AlPO_4$, appropriate precursor materials were calcined at 1220° C. for 8 hours, and in the case of tridymite phase $SiO_2$ appropriate precursor materials were calcined at 1400° C. for 8 hours. In Examples 1-1–1-3, the conductive powder was added in an amount of 32 vol %, and in the remaining examples the conductive powder was added in an amount of 28 vol %.

TABLE 1

Composition of composite PTC Material

| | Conductive Material | Average Size of Conductive Particle | Matrix Material | Percolation Threshold Resistivity, Ω cm | | Number of Cycles |
|---|---|---|---|---|---|---|
| | | | | 30° C. | 300° C. | |
| 1-1 | $MoSi_2$ | 1 μm | $SiO_2$ (Cr) | 62.5 | 8.03E+01 | >1000 |
| 1-2 | $MoSi_2$ | 5 μm | $SiO_2$ (Cr) | 0.82 | 2.49E+02 | >1000 |
| 1-3 | $MoSi_2$ | 10 μm | $SiO_2$ (Cr) | 0.78 | 7.70E+02 | >1000 |
| 1-4 | $MoSi_2$ | 15 μm | $SiO_2$ (Cr) | 0.046 | 4.27E+02 | >1000 |
| 1-5 | $MoSi_2$ | 20 μm | $SiO_2$ (Cr) | 0.021 | 3.06E+04 | >1000 |
| 1-6 | $MoSi_2$ | 30 μm | $SiO_2$ (Cr) | 0.012 | 9.52E+04 | >1000 |
| 1-7 | $MoSi_2$ | 40 μm | $SiO_2$ (Cr) | 0.012 | 9.52E+04 | >100 |
| 1-8 | $MoSi_2$ | 50 μm | $SiO_2$ (Cr) | 0.009 | 1.15E+06 | >10 |
| 1-9 | $MoSi_2$ | 60 μm | $SiO_2$ (Cr) | 0.009 | 3.21E+06 | 1 |
| 1-10 | $TaSi_2$ | 20 μm | $SiO_2$ (Tr) | 0.015 | 2.46E+02 | >1000 |
| 1-11 | $TaSi_2$ | 20 μm | $AlPO_4$ (Cr) | 0.018 | 1.56E+04 | >1000 |
| 1-12 | Mo Metal | 20 μm | $SiO_2$ (Cr) | 0.016 | 4.86E+05 | >10 |

Remark:
$SiO_2$ (Cr): Cristobalite Phase $SiO_2$
$SiO_2$ (Tr): Tridymite Phase $SiO_2$
$AlPO_4$ (Cr): Cristobalite Phase $MPO_4$ Examples 1-1 and 1-2 in Table 1 show the importance of using conductive particles having an average particle size of at least 5 μm. In the case of Example 1-1, wherein the average particle size of the conductive particles was 1 μm, the room temperature resistivity was 62.5 Ωcm. On the other hand, in the case of Example 1-2 where the average particle size of the conductive particles was 5 μm, the room temperature resistivity was 0.82 Ωcm.

Example 1-5 was repeated, except that dopant materials were added thereto as shown in Examples 2-1–2-6 in Table 2. Examples 2-7 and 2-8 are also similar to Example 1-5, except tridymite phase $SiO_2$ and cristobalite phase $AlPO_4$ were used as the matrix material, respectively. In Examples 2-1–2-8, Na and K were added to stabilize the crystal structure of the matrix and facilitate sintering.

TABLE 2

| | Composition of composite PTC material | | | Sintering Aid | Resistivity, Ω cm | | Transition Temp. |
|---|---|---|---|---|---|---|---|
| 2-1 | $MoSi_2$-20 μm | $SiO_2$ (Cr) | $Al_2O_3$-0.05 mol % | $NaHCO_3$-0.4 mol % | 0.92 | 8.76E+05 | 240° C. |
| 2-2 | $MoSi_2$-20 μm | $SiO_2$ (Cr) | $Al_2O_3$-0.1 mol % | $NaHCO_3$-0.4 mol % | 0.61 | 1.30E+05 | 190° C. |
| 2-3 | $MoSi_2$-20 μm | $SiO_2$ (Cr) | $Al_2O_3$-0.5 mol % | $NaHCO_3$-0.4 mol % | 0.021 | 3.06E+04 | 170° C. |
| 2-4 | $MoSi_2$-20 μm | $SiO_2$ (Cr) | $Al_2O_3$-20 mol % | $NaHCO_3$-0.4 mol % | 0.016 | 1.84E+02 | 150° C. |
| 2-5 | $MoSi_2$-20 μm | $SiO_2$ (Cr) | $Al_2O_3$-25 mol % | $NaHCO_3$-0.4 mol % | 0.009 | 1.50E-02 | — |
| 2-6 | $MoSi_2$-20 μm | $SiO_2$ (Cr) | $B_2O_3$-0.5 mol % | $NaHCO_3$-0.4 mol % | 0.021 | 3.06E+04 | 180° C. |
| 2-7 | $MoSi_2$-20 μm | $SiO_2$ (Tr) | $B_2O_3$-1 mol % | $KHCO_3$-0.4 mol % | 0.031 | 1.67E+02 | 140° C. |
| 2-8 | $MoSi_2$-20 μm | $AlPO_4$ (Cr) | $Al_2O_3$-1 mol % | $NaHCO_3$-0.4 mol % | 0.084 | 2.31E+02 | 150° C. |

Remark
$SiO_2$ (Cr): Cristobalite Phase $SiO_2$
$SiO_2$ (Tr): Tridymite Phase $SiO_2$
$AlPO_4$ (Cr): Cristobalite Phase $AlPO_4$ Examples 1-8 and 1-9 also show that if the average particle size of the conductive particles exceed 50 μm, the cycle life is reduced from greater than 10 to 1. The reason for this is that the large conductive particles cause large stress at the interface between the matrix and the conductive particles.

Examples 1-5–1-7 show that when the average particle size of the conductive particles is between 20 and 40 μm, extremely low room temperature resistivity can be realized and a resistivity jump of $10^7$ is exhibited at the trip-point temperature of the material (i.e., the crystal structure transition/transformation temperature of the matrix).

Example 2

The following Examples 2-1–2-8 show the effects of adding dopant material to the matrix in the manner described earlier herein.

Examples 2-1 and 2-2 show that if $Al_2O_3$ is added as a dopant to the matrix material in an amount of at least 0.1 mol %, the transition temperature of the PTC composite material can be reduced substantially. On the other hand, Examples 2-4 and 2-5 show that if $Al_2O_3$ is added as a dopant to the matrix material in an amount greater than 20 mol %, the resultant composite material does not exhibit any significant PTC behavior, because the large amount of $Al_2O_3$ causes the matrix to convert to mullite, which does not exhibit PTC behavior.

Example 3

Examples 3-1–3-12 are samples of PTC composite material similar to those from Examples 1 and 2, but with the addition of polymer material to form part of the matrix. In each of the examples, $NbSi_2$ was added in an amount of 27 vol %.

The results in Table 3 demonstrate that adding at least 5 vol % polymer to the matrix increases the overall density of the composite material and thus reduces room temperature resistivity. Increased density also improves the cycle life of the composite material, as the denser material has increased toughness. As the addition of polymer material to the matrix reduces the amount of ceramic material in the matrix, its presence reduces resistivity jump. Therefore, polymer material should not be added in an amount greater than 40 vol %.

The results in Table 3 also demonstrate that polymers having poor thermal stability, such as epoxy resin, exhibit poor cycle life, and should thus be avoided. The most preferred polymer material is silicone resin, because it exhibits high heat resistance and bonds well with the ceramic matrix material.

TABLE 3

| Composition of Composite PTC Material | | | | Percolation Threshold | | | Cycle Life |
|---|---|---|---|---|---|---|---|
| Conductive | Matrix | | | Resistivity, $\Omega$ cm | | Transition | by External |
| Material | Material | Dopant to $SiO_2$ | Polymer Material | 30° C. | 250° C. | Temp. | Heating |
| 3-1 | $NbSi_2$-20 μm | $SiO_2$ (Cr) | $Al_2O_3$-20 mol % | Epoxy Resin-10 vol % | 0.44 | 8.76E+02 | 150° C. | <10 cycle |
| 3-2 | $NbSi_2$-20 μm | $SiO_2$ (Cr) | $Al_2O_3$-0.5 mol % | Poly-methyl-siloxane-2 vol % | 52.4 | 1.30E+07 | 190° C. | <3 cycle |
| 3-3 | $NbSi_2$-20 μm | $SiO_2$ (Cr) | $Al_2O_3$-0.5 mol % | Poly-methyl-siloxane-5 vol % | 5.81 | 5.86E+06 | 190° C. | >10 cycle |
| 3-4 | $NbSi_2$-20 μm | $SiO_2$ (Cr) | $Al_2O_3$-0.5 mol % | Poly-methyl-siloxane-10 vol % | 0.86 | 1.84E+05 | 190° C. | >50 cycle |
| 3-5 | $NbSi_2$-20 μm | $SiO_2$ (Cr) | $Al_2O_3$-0.5 mol % | Poly-methyl-siloxane-20 vol % | 0.42 | 1.50E+03 | 190° C. | >500 |
| 3-6 | $NbSi_2$-20 μm | $SiO_2$ (Cr) | $Al_2O_3$-0.5 mol % | Poly-methyl-siloxane-30 vol % | 0.061 | 3.06E+02 | 190° C. | >500 |
| 3-7 | $NbSi_2$-20 μm | $SiO_2$ (Tr) | $Al_2O_3$-0.5 mol % | Poly-methyl-siloxane-40 vol % | 0.038 | 1.67E+01 | 190° C. | >500 |
| 3-8 | $NbSi_2$-20 μm | $SiO_2$ (Cr) | $Al_2O_3$-0.5 mol % | Poly-methyl-siloxane-60 vol % | 0.055 | 2.31E−01 | 190° C. | >500 |
| 3-9 | $NbSi_2$-20 μm | $SiO_2$ (Cr) | $Al_2O_3$-0.5 mol % | Polyimide-20 vol % | 0.055 | 1.51E+03 | 190° C. | >50 |
| 3-10 | $NbSi_2$-20 μm | $SiO_2$ (Cr) | $Al_2O_3$-0.5 mol % | Polybutylene-terephthalate-20 vol % | 0.133 | 8.32E+04 | 190° C. | >50 |
| 3-11 | $NbSi_2$-20 μm | $SiO_2$ (Cr) | $Al_2O_3$-0.5 mol % | Polyphenylene-sulfide-20 vol % | 0.085 | 6.35E+03 | 190° C. | >50 |
| 3-12 | $NbSi_2$-20 μm | $AlPO_4$ (Cr) | $Al_2O_3$-20 mol % | Polyamideimide-20 vol % | 0.055 | 2.31E−01 | 150° C. | >500 |

Remark:
$SiO_2$ (Cr): Cristobalite Phase $SiO_2$
$SiO_2$ (Tr): Tridymite Phase $SiO_2$
$AlPO_4$ (Cr): Cristobalite Phase $AlPO_4$
Poly-methyl-siloxane: Silicone resin While the present invention has been described with reference to a particular preferred embodiment and the accompanying drawings, it will be understood by those skilled in the art that the invention is not limited to the preferred embodiment and that various modifications and the like could be made thereto without departing from the scope of the invention as defined in the following claims.

What is claimed:

1. A PTC material comprising a matrix of ceramic material having one of a cristobalite crystal structure and a tridymite crystal structure, said ceramic material being doped with an oxide of at least one of Be, B, Mg, Al, Ca, Sc, Ti, V, Cr, Mn, Fe, Co, Ni, Cu, Zn, Ga, and Ge, and a conductive phase dispersed throughout said matrix, said conductive phase comprising at least one of a metal, silicide, nitride, carbide and boride.

2. The PTC material of claim 1, wherein said ceramic material is at least one of cristobalite phase $SiO_2$, tridymite phase $SiO_2$, cristobalite phase $AlPO_4$, and tridymite phase $AlPO_4$.

3. The PTC material of claim 1, wherein the transition temperature of said material is not greater than 200° C.

4. The PTC material of claim 1, wherein said matrix is doped with said oxide in an amount of 0.1 mol % to 20 mol %.

5. The PTC material of claim 1, wherein the resistivity of the material at 300° C. is at least 10 times greater than the resistivity of the material at 30 ° C.

6. The PTC material of claim 1, wherein the room temperature resistivity of the material is not greater than 1 $\Omega$cm.

7. The PTC material of claim 2, wherein the room temperature resistivity of said material is not greater than 1 $\Omega$cm, the transition temperature of said material is not greater than 200° C., and the resistivity of the material at 300° C. is at least 10 times greater than the resistivity of the material at 30 ° C.

8. The PTC material of claim 1, wherein the conductive phase is at least one silicide containing at least one element selected from the group consisting of Ti, Zr, V, Nb, Ta, Cr, Mo, W, Co, and Fe.

9. The PTC material of claim 1, wherein the conductive phase is at least one silicide containing at least one element selected from the group consisting of Nb, Ta, Cr, Mo and W.

10. The PTC material of claim 1, wherein the volume expansion of said material at the transition temperature thereof is 0.2% to 1.4%.

11. A PTC material comprising (i) a matrix of at least one of cristobalite phase $SiO_2$, tridymite phase $SiO_2$, cristobalite phase $AlPO_4$, and tridymite phase $AlPO_4$, each doped with 0.1 mol % to 20 mol % of an oxide of at least one of Be, B, Mg, Al, Ca, Sc, Ti, V, Cr, Mn, Fe, Co, Ni, Cu, Zn, Ga, and Ge, and (ii) a conductive phase dispersed throughout said matrix, said conductive phase comprising at least one of a metal, silicide, nitride, carbide and boride, wherein the resistivity of the composite material at 300° C. is at least 10 times greater than the resistivity of the material at 30 ° C.

12. The PTC material of claim 11, wherein the room temperature resistivity of said material is not greater than 1 $\Omega$cm and the transition temperature of said material is not greater than 200° C.

13. The PTC material of claim 11, wherein the conductive phase is at least one silicide containing at least one element selected from the group consisting of Ti, Zr, V, Nb, Ta, Cr, Mo, W, Co, and Fe.

14. The PTC material of claim 11, wherein the conductive phase is at least one silicide containing at least one element selected from the group consisting of Nb, Ta, Cr, Mo and W.

15. The PTC material of claim 11, wherein the volume expansion of said material at the transition temperature thereof is 0.2% to 1.4%.

* * * * *

UNITED STATES PATENT AND TRADEMARK OFFICE
CERTIFICATE OF CORRECTION

PATENT NO. : 6,300,862 B1  
DATED : October 9, 2001  
INVENTOR(S) : Yoshihiko Ishida Page 1 of 1

It is certified that error appears in the above-identified patent and that said Letters Patent is hereby corrected as shown below:

<u>Title page,</u>  
Item [56], References Cited, please replace "OTHER PUBLICATIONS" with  
-- T. Ota et al., "*Positive-temperature-coefficient Effect in Conductive-Ceramic/High-expansive-ceramic Composites,*" Journal of Materials Science Letters 16, (1997) pp 239-240.

T. Harada et al., "*Preparation of Graphite/Cristobalite/Silicone Rubber PTC Composites,*" Journal of the Ceramic Society of Japan, Int. Edition, 104(12), (1996) pp. 1133-1136. --

Signed and Sealed this

Twenty-sixth Day of March, 2002

*Attest:*

*Attesting Officer*

JAMES E. ROGAN  
*Director of the United States Patent and Trademark Office*